United States Patent [19]

Ootsuka

[11] Patent Number: 4,481,599
[45] Date of Patent: Nov. 6, 1984

[54] VOICE DATA OUTPUT DEVICE PROVIDING OPERATOR GUIDANCE IN VOICE FORM

[75] Inventor: Tetsuo Ootsuka, Tokyo, Japan

[73] Assignee: Casio Computer Co., Ltd., Tokyo, Japan

[21] Appl. No.: 540,910

[22] Filed: Oct. 12, 1983

Related U.S. Application Data

[63] Continuation of Ser. No. 259,817, May 4, 1981, abandoned.

[30] Foreign Application Priority Data

May 12, 1980 [JP] Japan .................. 55-62392

[51] Int. Cl.$^3$ .............................. G06F 3/16
[52] U.S. Cl. ..................... 364/710; 364/405
[58] Field of Search ............ 364/405, 404, 710, 900; 381/51

[56] References Cited

U.S. PATENT DOCUMENTS

| | | | |
|---|---|---|---|
| 3,668,648 | 6/1972 | Yoshikawa | 364/900 |
| 3,976,975 | 8/1976 | Cochran | 364/900 |
| 4,060,848 | 11/1977 | Hyatt | 364/200 |
| 4,179,584 | 12/1979 | Tanimoto et al. | 381/51 |
| 4,185,169 | 1/1980 | Tanimoto et al. | 381/51 |
| 4,276,444 | 6/1981 | Tanimoto et al. | 381/51 |
| 4,282,404 | 8/1981 | Tanimoto et al. | 381/51 |
| 4,348,551 | 9/1982 | Nakatani et al. | 364/405 |
| 4,369,334 | 1/1983 | Nakatani et al. | 364/405 |

Primary Examiner—David H. Malzahn
Attorney, Agent, or Firm—Frishauf, Holtz, Goodman & Woodward

[57] ABSTRACT

A voice data output apparatus having a voice output circuit which audibly produces an operator guidance to show the next operation to an operator and repeats the vocal sound of the operator guidance until an operation is performed in an input circuit in accordance with the operator guidance. A CPU is connected to a print circuit, a display circuit, a RAM, the input circuit and the voice output circuit, through chip designating signal lines, a read/write signal line, an address bus line, and a data bus line. The CPU transfers chip designating signals to the respective circuits to select the circuit to be used. The display circuit and the voice output circuit are selected by the same chip selecting signal. The voice output circuit has a CPU which has at least a register for storing inputted data and a plurality of memory areas for arithmetic operation. The CPU of the voice output circuit obtains operator guidance data to direct an operator to the next operation, on the basis of the contents of the register and the contents of the plurality of the memory areas, repeatedly transfers the guidance data, and stops the transfer of the guidance data when an operation is performed in accordance with the guidance. The guidance data is converted into an analog signal by a synthesizing unit connected to the CPU and constituting the voice output circuit, and is produced as a voice from a speaker connected to the synthesizing unit. The synthesizing unit is connected to a ROM which digitally stores the voice data pronounced by the speaker, and reads out digital voice data from the ROM, if necessary.

4 Claims, 16 Drawing Figures

VOICE DATA OUTPUT DEVICE PROVIDING OPERATOR GUIDANCE IN VOICE FORM

This application is a continuation of application Ser. No. 259,817, filed May 4, 1981, now abandoned.

BACKGROUND OF THE INVENTION

The present invention relates to a voice data output apparatus for producing data in a vocal manner and, more particularly, to a voice data output apparatus for audibly giving an operator a guidance of the next operation.

It is a common practice that in electronic cash registers, its operation includes a preset operation to preset the limit of the number of digits of entry data, fixed unit prices, fixed tax rates, percent rates and so on. In the preset operation of the department, for example, the order of presetting the data, such as a group code, the digit limit and the unit price, is previously determined. The preset operation is performed depending on the order memorized by the operator. This fact leads to frequent errors of the data inputting order. For avoiding the erroneous order of the data inputting, an operation sequence check sheet has been used for the preset operation. This is superfluous and troublesome work for the operator.

Accordingly, a first object of the present invention is to provide a voice data output apparatus for audibly giving an operator guidance for the next operation.

A second object of the present invention is to provide a voice data output apparatus which, when the guidance for the next operation is to be audibly given to the operator, inhibits the vocal sounding after a specified number of repetitions of sounding.

SUMMARY OF THE INVENTION

To achieve the first object of the present invention, there is provided a voice data output apparatus comprising: input means for inputting data; control means connected to said input means, which performs a specified operation in accordance with an input signal from said input means to produce data and control signals; and voice output means connected to said control means, which repetitively produces in vocal sound an operator guidance indicative of at least the next operation sequence in accordance with the data and the control signals delivered from control means, and prohibits the outputting of said vocal sound when an operation is performed by said input means in accordance with said operator guidance.

To achieve the second object, there is provided a voice data output apparatus comprising: input means for inputting data; control means connected to said input means, which performs a specified operation in accordance with an input signal from said input means to produce data and control signals; and voice output means connected to control means, which repetitively produces in vocal sound an operator guidance indicative of at least the next operation sequence in accordance with the data and the control signals delivered from control means, and prohibits the outputting of said vocal sound when outputting of vocal sound is repeatedly carried out a specified, or smaller than specified, number of times.

As described above, in the present invention, when the operator guidance to direct the operator to the next operation is outputted in a vocal manner, the vocal sound is repeated until the operation according to the operator guidance is performed at the input means or a specified, or smaller than specified, number of the soundings is repeated. With this configuration, the operator can perform the next operation in accordance with the operator guidance audibly produced. Therefore, the operation error by the operator is reduced. Further, there is no need for the operation sequence check sheet in the operation of the cash register. This lightens the load of the operator in the registration. Further, since the vocal sounding of the operator guidance is repeated, the operator could correctly hear the contents of the guidance, leading to reduction of mishear by the operator.

DETAILED DESCRIPTION

Figure 1:
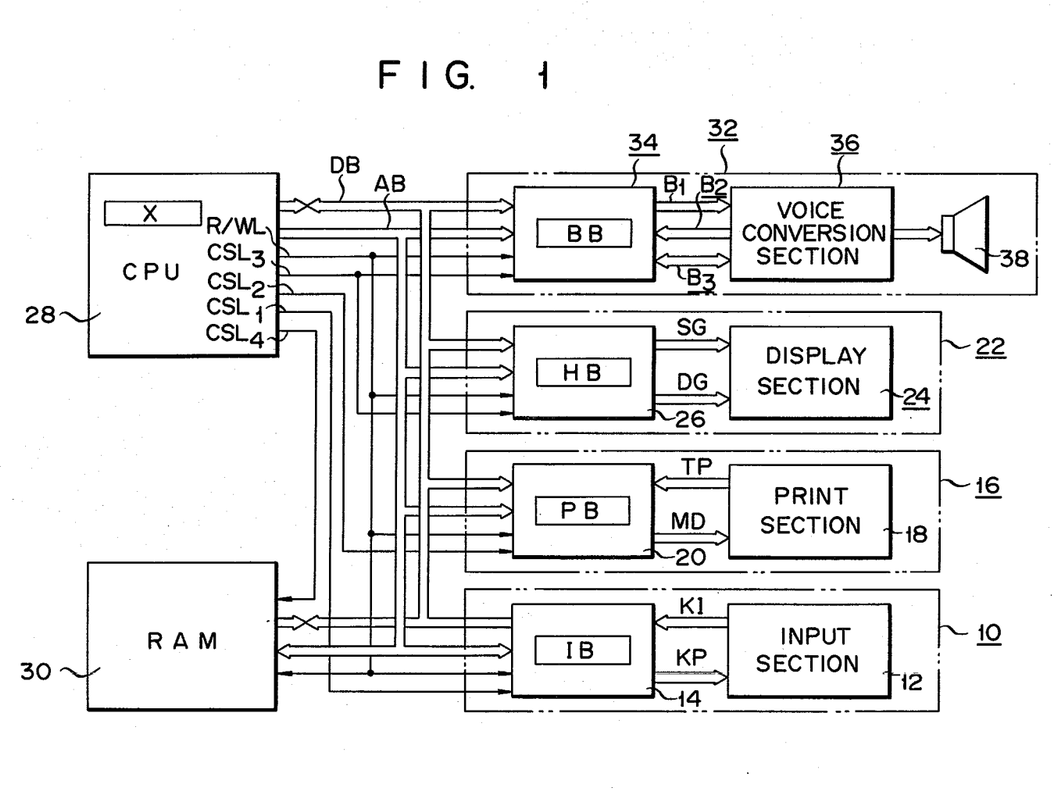
FIG. 1 is a block schematic diagram of an electronic cash register to which a voice data output apparatus according to the present invention is applied.

FIG. 1 schematically illustrates an arrangement of a first embodiment of a voice data output apparatus according to the invention when it is applied to an electronic cash register.

An input circuit 10 is comprised of an input section 12 and an input control section 14 connected to the input section 12.

The input section 12 is equipped with various keys, such as an amount (numerical) key, a department key, a sub-total key, a clear key, and a discount key. Besides, it is also equipped with mode switches to set up the respective modes; a registration mode "REG", a refund mode "REF", a set mode "SET", a check mode "X", a settlement mode "Z", and the like.

The above-mentioned input control section 14, having an input buffer IB, transmits a timing signal KP for key sampling to the input section 12. When a key is operated at the input section 12, a signal provided by the key selected is sampled by the timing signal KP, and the sampled signal is transferred as a key-in signal KI to the input buffer IB of the input control section 14.

A print circuit 16 is comprised of a print section 18 and a print control section 20 connected to the print section 18.

The print section 18 with a print drum (not shown) transfers a print position signal TP representing a print position of the drum to the print control section 20. The print control section 20 has a print buffer PB and transfers to the print section 18 a print drive signal MD formed on the basis of data stored in the buffer PB and the print position signal TP. The print section 18, upon receipt of the print drive signal MD, prints amount data and the like on sheets of a journal and a receipt by means of the print drum.

A display circuit 22 is comprised of a display section 24 and a display control section 26 connected to the display section 24.

The display control section 26 has a display buffer HB to transfer a segment signal SG formed by decoding data stored in the buffer HB and a digit signal DG to the display section 24. The display section 24 displays amount data and the like based on receiving both the signals.

The respective control sections 14, 20 and 26 are connected to a central processing unit (CPU) 28 and a random access memory (RAM) 30 via an address bus line AB and a data bus line DB.

The CPU 28 is connected to the input control section 14 via a chip designating line $CSL_1$ and selects the control section 14 by a chip designating signal $CS_1$. The CPU 28 is also connected to the print control section 20 via a chip designating line $CSL_2$, and selects the control section 20 by a chip designating signal $CS_2$. It is also connected to the display control section 26 via a chip designating signal line $CSL_3$, and selects the control section 26 by a chip designating signal $CS_3$. Again, it is connected to the RAM 30 by way of a chip designating line $CSL_4$ to select the RAM 30 by a chip designating signal $CS_4$. Further, the CPU 28 is connected to the respective control sections 14, 20 and 26, and the RAM 30 through a read/write signal line R/WL to transfer the data to and from a selected device through the bus line DB in response to the signal R/W and the respective chip designating signals $CS_1$ to $CS_4$. The CPU 28 has a register X with memory capacity of 12 digits each having at least 4 bits. Sales data inputted from the input section 12 is classified into various groups, such as a department group, a transaction group, and the like, and the sales data thus classified are stored in the RAM 30.

A voice output circuit 32 is comprised of a voice control section 34, a voice conversion section 36 connected to the voice control section 34, and a speaker 38 coupled with the voice conversion section 36. The voice output circuit 32 is coupled in a removable manner to the address bus line AB, the data bus line DB, the chip designating signal lines $CSL_1$ to $CSL_4$, and the read/write signal line R/WL.

The voice control section 34 has a voice buffer BB into which a data transferred from the CPU 28 is written. The voice control section 34 is connected to the voice conversion section 36 via the bus lines $B_1$, $B_2$ and $B_3$ to transfer the data to and from the voice conversion section 36, through the bus lines $B_1$ to $B_3$. The voice conversion section 36 converts the data applied from the control section 34 into voice data, and transfers it to the speaker 38. The speaker 38, in response to the voice data transferred from the voice conversion section 36, produces a corresponding voice.

Figure 2:
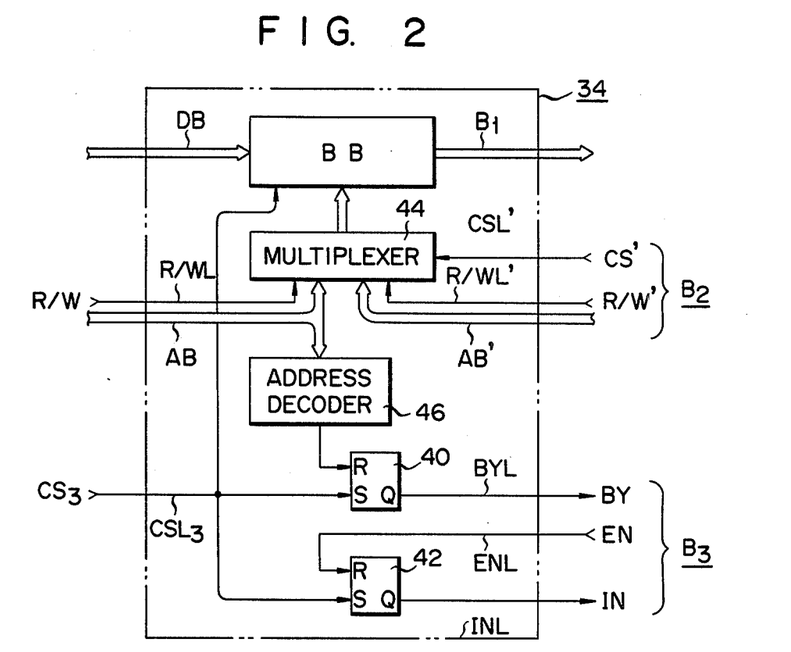
FIG. 2 is a block schematic diagram of an arrangement of the voice control section shown in FIG. 1.

FIG. 2 schematically illustrates in block form a circuit arrangement of the voice control section 34.

Flip-flops 40 and 42, each being connected at the set input terminal S to the chip designating signal line $CSL_3$, receive a chip designating signal $CS_3$ through the chip designating signal line $CSL_3$. The set output terminal of the flip-flop 40 is connected to a busy signal line BYL, and outputs a busy signal BY through the line BYL. The set output terminal Q of the flip-flop 42 is connected to an input signal line INL, and outputs an input signal IN through the line INL. The reset input terminal R of the flip-flop 42 connected to an end signal line ENL is reset by an end signal EN delivered via the line ENL to stop outputting of the input signal IN.

The voice buffer BB with a memory capacity of 12 digits each having 4 bits is connected to a multiplexer 44, the data bus line DB, the chip designating line $CSL_3$, and the bus line $B_1$. The data transferred through the data bus line DB is loaded into the voice buffer BB, in response to address data and a read/write signal coming from the multiplexer 44. Through the bus line $B_1$, the voice buffer BB outputs data stored therein in response to address data on an address bus line AB', and a read/write signal R/W' on a read/write signal line R/WL' both being transferred from the multiplexer 44.

The multiplexer 44 is connected to the read/write signal line R/WL, the address bus line AB, a chip designating signal line CSL', the read/write signal line R/WL', and the address bus line AB'. Via the chip designating signal line CSL', a chip designating signal CS' is applied to the multiplexer 44 of which input state is switched. In accordance with the input state switched, the multiplexer 44 outputs to the voice buffer BB the read/write signal R/W applied through the read/write signal line R/WL, and the address data applied through the address bus line AB, or the multiplexer 44 outputs to the voice buffer BB the read/write signal R/W' applied through the read/write signal line R/WL' and the address data applied through the address bus line AB'.

An input terminal of an address decoder 46 is connected to the address bus line AB, and its output terminal is connected to the reset input terminal R of the flip-flop 40. The address decoder 46 receives the address data applied by way of the address bus line AB and when the address data indicating the 12th digit in the register X of the CPU 28 is detected, outputs a reset signal to the reset input terminal R of the flip-flop 40, thereby to stop the outputting of the busy signal BY.

The chip designating signal line CSL', the read/write signal line R/WL', and the address bus line AB, make up the bus line $B_2$. And the busy signal line BYL, the end signal line ENL, and the input signal line INL constitute the bus line $B_3$.

Figure 3:
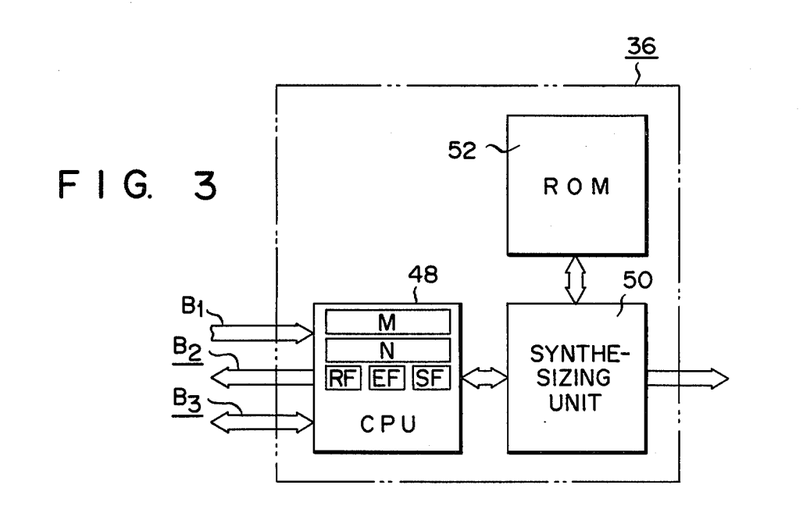
FIG. 3 is a block schematic diagram of an arrangement of the voice conversion section shown in FIG. 1.

FIG. 3 is a block diagram schematically illustrating a circuit arrangement of the voice conversion section 36. The voice conversion section 36 is comprised of a CPU 48, a synthesizing unit 50 connected with the CPU 48, and a read only memory (ROM) 52 connected to the synthesizing unit 50.

The CPU 48 is connected to the voice control section 34 via the bus lines $B_1$ to $B_3$ to transfer data to and from the voice control section 34. The CPU 48 also transfers data to and from the synthesizing unit 50. Further, the CPU 48 has registers M and N with their memory capacities of 12 digits having 4 bits for each and memory areas RF, EF and SF. Characters $M_0$ to $M_{11}$, and $N_0$ to $N_{11}$ are respectively attached, in the order from small to large digit numbers, to the respective digits of the registers M and N. Data read from the voice buffer BB is written into the register M. The data of the number of repetitions in a repeat registration mode is stored in the digits $N_8$ and $N_9$ of the register N. The data of kinds of voice is preset in the digit $N_{10}$ of the register N. More specifically, in the repeat registration mode, "1" is preset when the number of sales is voiced, and "0" is preset when the voice "REPEAT" is outputted, through an operation at the input section 12. Into the memory area RF, "1" is written when a registration of one customer is completed, and "0" is written when a first entry number is inputted in the registration mode. Into the memory area EF, "0" is loaded when there is no error, "1" is loaded when a nonfunction error occurs, and "2" is loaded when an error of discount occurs. Into the memory area SF, "0" is loaded when a sequence of inputting guidance data is not designated, and "1" or "2" is stored when the sequence of inputting guidance data is designated.

Data of analyzed voice outputted from the speaker 38 has been stored in the ROM 52.

The synthesizing unit 50 is comprised of an interface section (not shown) and a digital/analog converter (not shown) which are provided between the CPU 48 and the ROM 52. The interface section of the synthesizing unit 50 reads out data from the ROM 52 on the basis of the data outputted from the CPU 48, and performs an arithmetic operation on the basis of the read out data, obtaining voice data. Then, the voice data is converted by the D/A converter into an analog signal, which is then applied to the speaker 38.

Figure 4:
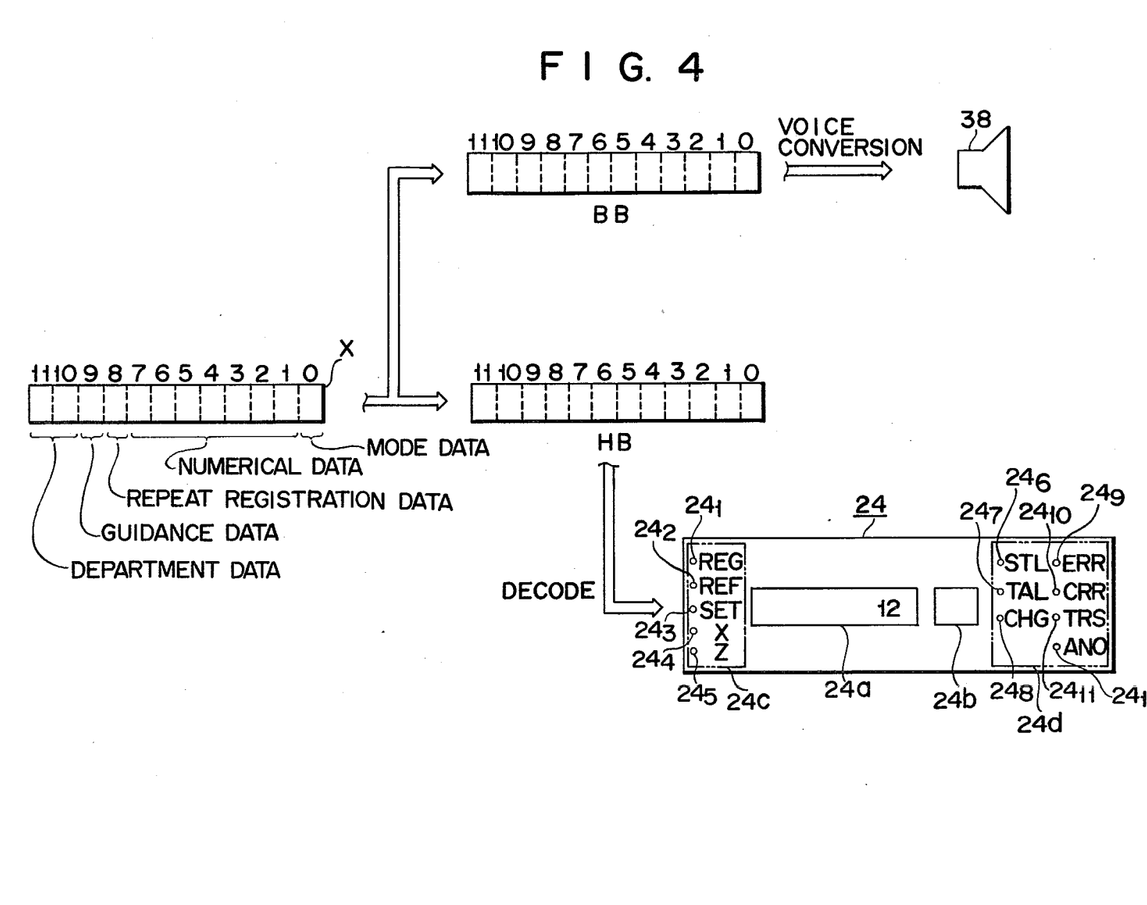
FIG. 4 is functions of the respective digits of a register X in a CPU shown in FIG. 1, flows of data from the register X and an arrangement of the display section.

The operation of the above-mentioned arrangement of the invention will be described. It is assumed that the voice output circuit 32 is connected to the electronic cash register of the embodiment. It is also assumed that data is stored in the register X of the CPU 28 as shown in FIG. 4. That is, mode data representing a set mode of the mode switch is stored in the digit $X_0$ (the digit of the register X attached with "0"); amount data is stored in digits $X_1$ to $X_7$ (the digits of the register X attached with "1" to "7"); "the number of the repeat registrations" data is stored in a digit $X_8$ (the digit of the register X attached with "8") when a registration/set mode switch provided in the input section 12 is switched to the registration mode, while data representing the input sequence of the guidance data is stored in the digit $X_8$ when the mode switch is switched to the set mode; further, in a digit $X_9$ (the digit of the register X attached with "9") is stored guidance data representative of kinds of amount data, such as sub-total, total, and the like; and in digits $X_{10}$ and $X_{11}$ (the digits of the register X attached with "10" and "11") is stored the department data inputted.

The display section 24 is comprised of an amount display portion 24a displaying amount data by means of light emitting diodes (LEDs), a department display portion 24b displaying department data by LEDs, a mode display portion 24c having LEDs $24_1$ to $24_5$ at the heads of "REG", "REF", "SET", "X" and "Z" corresponding to the mode switches of the input section 12, a guidance display portion 24d with LEDs $24_0$ to $24_{12}$ at the heads of "SUB-TOTAL (STL)", "TOTAL (TAL)", "CHANGE (CHG)", "ERROR (ERR)", "CORRECTION (CRR)", "TRANSFER (TRS)" and "ARTICLE NUMBER (ANO)" corresponding to a sub-total key, a total key, and like in the input section 12.

Under this condition, data stored in the register X of the CPU 28 is transferred to the display buffer HB of the display control section 26 when a program for displaying is executed by the CPU 28. At the same time, since the chip designating signal $CS_3$ is transferred to the voice control section 34 from the CPU 28, the data of the register X is also written into the voice buffer BB.

The data applied to the display buffer HB is decoded in the display section 26, being displayed in the display section 24, as shown in FIG. 4. Specifically, amount data, department data, mode data, and guidance data are respectively indicated by the lighting of the LEDs at the amount display portion 24a, the department display portion 24b, the mode display portion 24c, and the guidance display portion 24d.

The data written into the voice buffer BB is converted into voice data in the voice conversion section 36 and transferred to the speaker 38. As a result, a voice is outputted from the speaker 38.

Figure 5:
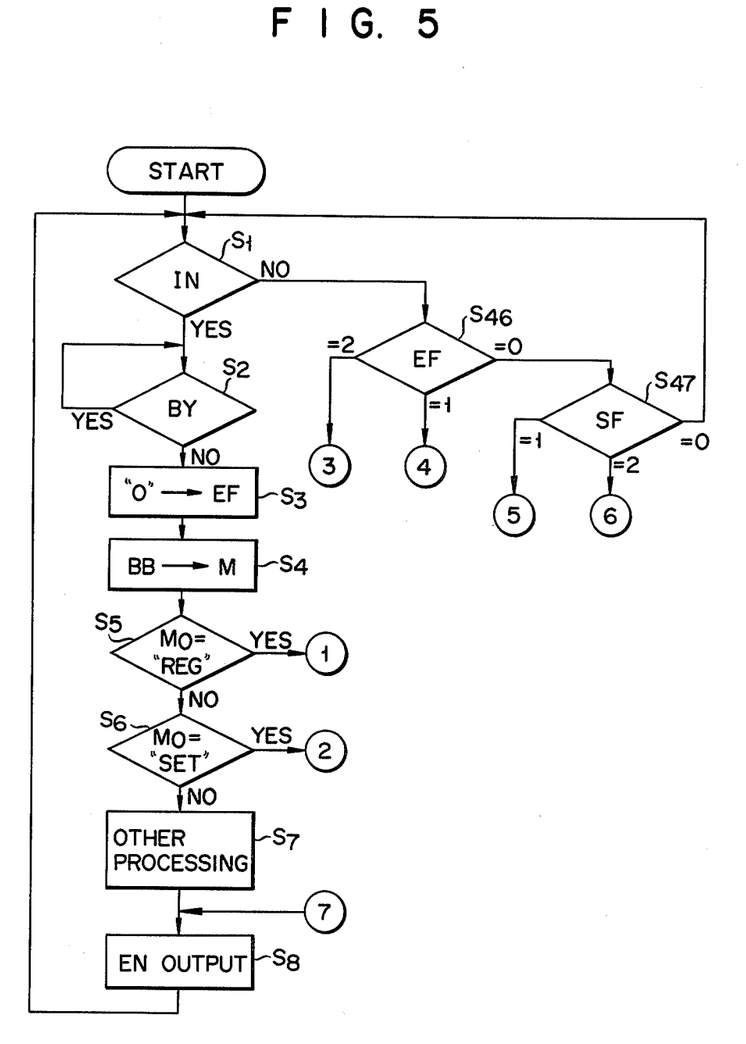
FIGS. 5 to 7 show flow charts of the voice conversion in the voice conversion section shown in FIG. 3.
Figure 6:
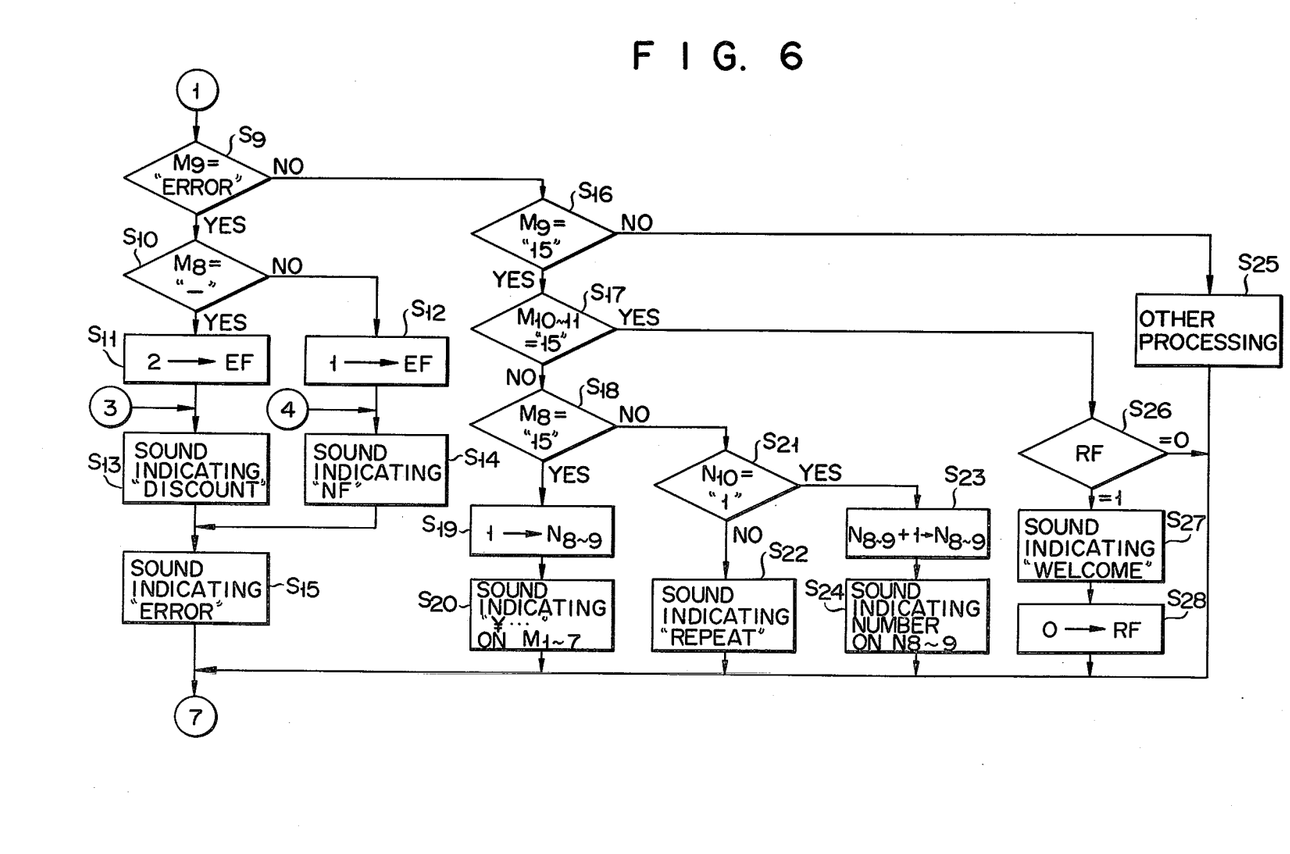
Figure 7:
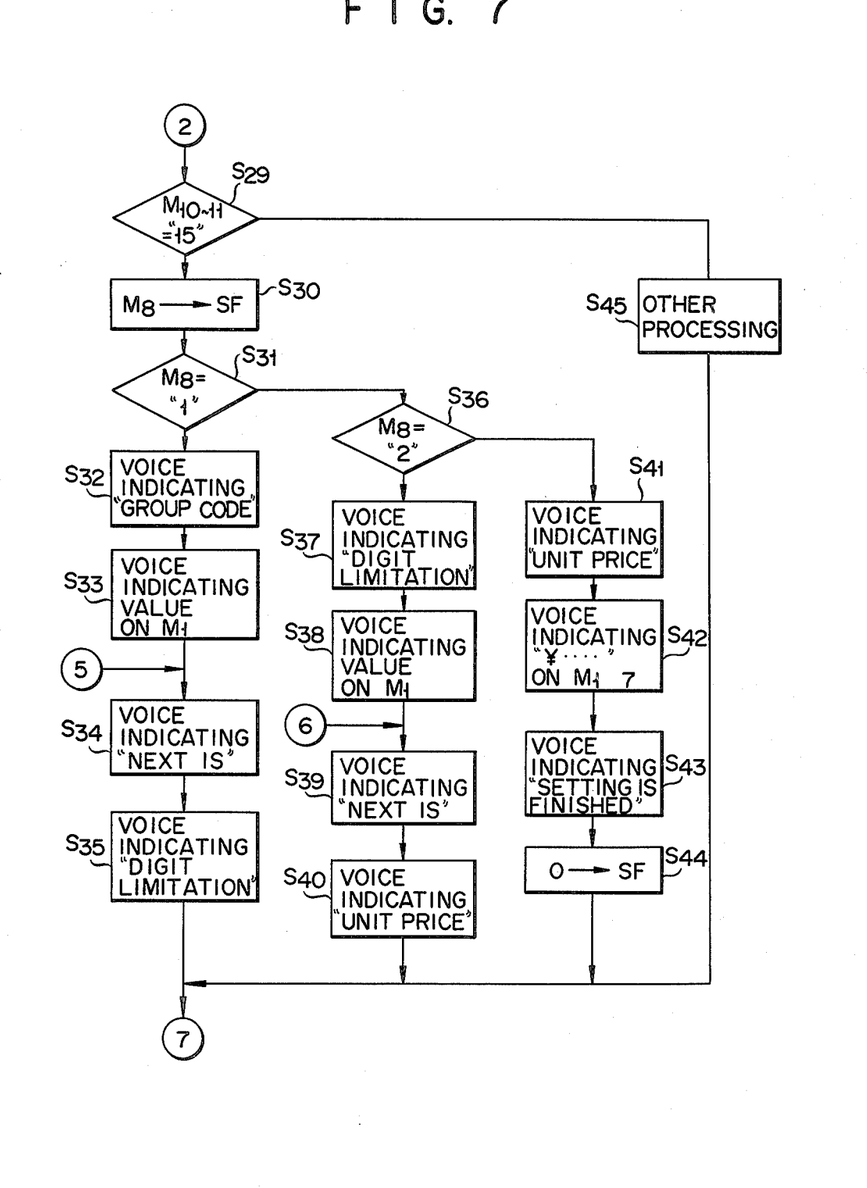

A voice output operation of the voice conversion section 36 in the voice output circuit 32 is performed in accordance with flow charts shown in FIGS. 5, 6 and 7.

At step $S_1$, it is judged whether or not an input signal IN is outputted from the voice control section 34. When it is judged that the signal IN is being outputted, the program shifts to step $S_2$.

At step $S_2$, it is judged whether or not the voice control section 34 outputs a busy signal BY. When it is judged that the busy signal BY is present, this step continues until the writing of data into the voice buffer BB of the voice control section 34 is completed. When it is judged that the busy signal BY is absent, the program shifts to step $S_3$.

At step $S_3$, "0" is written into the memory area EF. Then, the program shifts to step $S_4$.

At step $S_4$, a chip designating signal CS' is sent to the multiplexer 44, changing the input state of the multiplexer 44. Then, the data stored in the voice buffer BB is written into the register M of the CPU 48. Then, the program shifts to step $S_5$.

At step $S_5$, it is judged whether or not the data stored in the digit $M_0$ of the register M in the CPU 48 is "REG" mode. In other words, it is judged whether or not the registration/set mode switch is set to the registration mode. When it is judged that the data stored in the digit $M_0$ is data other than those of "REG" mode, the program shifts to step $S_6$.

At step $S_6$, it is judged whether or not the data stored in the digit $M_0$ is "SET" mode. That is, it is judged whether or not the registration/set mode switch in the input section 12 is switched to the set mode. When it is judged that the data stored in the digit $M_0$ is not "SET" mode data, then the program shifts to step $S_7$.

At step $S_7$, another processing is performed in accordance with the mode data of the digit $M_0$. Then, the program shifts to step $S_8$.

At step $S_8$, an end signal EN is outputted from the CPU 48. The end signal EN resets the flip-flop 42 of the voice control section 34, interrupting the output of an input signal IN from the flip-flop 42. Then, the program returns to step $S_1$. This step continues until the input signal IN is outputted from the flip-flop 42 which has been set again by the next key operation.

At step $S_5$, when it is judged that "REG" mode data is stored in the digit $M_0$ of the register M, the program shifts to step $S_9$ shown in FIG. 6.

At step $S_9$, it is judged whether or not the guidance data stored in the digit $M_9$ of the register M is "ERROR" data. When it is judged that the data is the "ERROR" data, the program shifts to step $S_{10}$.

At step $S_{10}$, it is judged whether or not the data stored in the digit $M_8$ of the register M is "-" (discount) data. That is, it is judged whether the error judged at step $S_9$ is a discount error or a nonfunction error. When it is judged that the data of the digit $M_8$ is discount data, the program shifts to step $S_{11}$. On the other hand, when it is judged that the data in the digit $M_8$ is nonfunction data, the program shifts to step $S_{12}$.

At step $S_{11}$, data "2" representing a discount error is written into the memory area EF. Then, the program shifts to step $S_{13}$.

At step $S_{13}$, a signal indicating "DISCOUNT" is transferred to the synthesizing unit 50, which in turn reads out necessary voice data from the ROM 52, obtains an analog voice data corresponding to "DISCOUNT", and then transfers it to the speaker 38. The speaker 38 outputs "DISCOUNT" in a vocal manner on the basis of the analog voice data.

On the other hand, at step $S_{12}$, a data indicating a nonfunction error is written into the memory area EF. Then, the program shifts to step $S_{14}$.

At step $S_{14}$, the analog voice data corresponding to "NF" is obtained by the synthesizing unit 50, and transferred to the speaker 38, which in turn outputs a voice "NF". The "NF" is an abbreviation of the word "nonfunction".

After the completion of step $S_{13}$ or $S_{14}$, the program shifts to the step $S_{15}$.

At step $S_{15}$, an analog voice data corresponding to "ERROR" is obtained by the synthesizing unit 50, transferred it to the speaker 38, which in turn outputs a vocal sound "ERROR". Then, the program returns to step $S_8$.

When at step $S_9$, the data of the digit $M_9$ is not the "ERROR" data, the program shifts to step $S_{16}$.

At step $S_{16}$, it is judged whether or not data of the digit $M_9$ is a blanking code "15". When it is judged that the data of the digit $M_9$ is the blanking code "15", the program shifts to step $S_{17}$.

At step $S_{17}$, it is judged whether or not the data of the digits $M_{10}$ and $M_{11}$ are blanking codes "15". In other words, it is judged whether or not the department data is stored in the digits $M_{10}$ and $M_{11}$. When it is judged that the department data is stored in the digits $M_{10}$ and $M_{11}$, the program shifts to step $S_{18}$.

At step $S_{18}$, it is judged whether or not the blanking code "15" is written into the digit $M_8$ of the register M. When the blanking code "15" is stored in the digit $M_8$, the program shifts to step $S_{19}$.

At step $S_{19}$, number-of-articles data "1" indicating that a commodity is sold is written into the digits $N_8$ and $N_9$ of the register N. Then, the program shifts to step $S_{20}$.

At step $S_{20}$, the amount data stored in the digits $M_1$ to $M_7$ of the register M is transferred from the CPU 48 to the synthesizing unit 50. The synthesizing unit 50 reads out necessary voice data from the ROM 52 on the basis of the amount data, obtains an analog voice data corresponding to the amount data "¥ . . . ", and then transfers it to the speaker 38. The speaker 38 outputs a voice "¥ . . . " on the basis of the analog voice data. Then, the program returns to step $S_8$.

At step $S_{18}$, when it is judged that the blanking code "15" is not written into the digit $M_8$, the program shifts to step $S_{21}$. In the repeat registration mode, "the number of repeat registrations" data has been stored in the digit $M_8$.

At step $S_{21}$, it is judged whether or not "1" is stored in the digit $N_{10}$ of the register N. When it is judged that "1" is stored in the digit $N_{10}$, the program shifts to step $S_{22}$.

At step $S_{22}$, an analog voice data corresponding to "REPEAT" is obtained by the synthesizing unit 50, and transferred to the speaker 38, which in turn outputs a voice "REPEAT". Then, the program shifts to step $S_8$.

At step $S_{21}$, when it is judged that "1" is stored in the digit $N_{10}$, the program shifts to step $S_{23}$.

At step $S_{23}$, an operation of adding "1" to the contents of the digits $N_8$ and $N_9$ of the register N is performed, and the result of the addition is restored in the digits $N_8$ and $N_9$. Therefore, in this process, the number of sales in the repeat registration mode is increased by "1". Then, the program shifts to step $S_{24}$.

At step $S_{24}$, "the number of sales" data of the repeat registration mode stored in the digits $N_8$ and $N_9$ is transferred to the synthesizing unit 50. Then, an analog voice data corresponding to "the number of sales" data is obtained by the synthesizing unit 50, and transferred to the speaker 38, which outputs a voice indicating the number of sales. Then, the program returns to step $S_8$.

At step $S_{16}$, it is judged that the data of the digit $M_9$ is not the blanking code "15", the program shifts to step $S_{25}$.

At step $S_{25}$, other operations are performed in accordance with guidance data in the digit $M_8$. Then, the program returns to step $S_8$.

At step $S_{17}$, when it is judged that the data in the digits $M_{10}$ and $M_{11}$ is the blanking code "15", the program shifts to step $S_{26}$. The blanking code "15" being stored in the digits $M_{10}$ and $M_{11}$ means that the key operated at the input section 12 is not the department key but the numerical key. Therefore, the data inputted is the amount data.

At step $S_{26}$, it is judged whether the data stored in the memory area RF is "0" or "1". When it is judged that the data is "1", the program shifts to step $S_{27}$.

At step $S_{27}$, an analog voice data corresponding to "WELCOME" is obtained by the synthesizing unit 50 and transferred to the speaker 38 which outputs a voice "WELCOME". Then, the program shifts to step $S_{28}$.

At step $S_{28}$, "0" is written into the memory area RF. Then, the program returns to step $S_8$. After the completion of the registration, "1" is written into the memory area RF through the other processing at step $S_{25}$. Accordingly, at step $S_{26}$ when it is judged that the "1" has been stored in the memory area RF, the first entry of figure has been made at the start of the registration.

At step $S_6$, when it is judged that the data stored in the digit $M_0$ is the "SET" mode data, the program shifts to step $S_{29}$ shown in FIG. 7. The data in the digit $M_0$ being the "SET" mode data means that the registration/set mode switch at the input section has been switched to the set mode.

At step $S_{29}$, it is judged whether or not the blanking code "15" is stored in the digits $M_{10}$ and $M_{11}$ of the register M. When it is judged that the code "15" is not stored in the digits $M_{10}$ and $M_{11}$, that is, when the department data is stored, the program shifts to step $S_{30}$.

At step $S_{30}$, the input sequence data of operator guidance stored in the digit $M_8$ of the register M is transferred to the memory area SF. Then, the program shifts to step $S_{31}$.

At step $S_{31}$, it is judged whether or not the content of the digit $M_8$ of the register M are "1". When it is judged that the data of the digit $M_8$ is "1", the program shifts to step $S_{32}$.

At step $S_{32}$, an analog voice data corresponding to "GROUP CODE" is obtained by the synthesizing unit 50, and transferred to the speaker 38, which outputs voice "GROUP CODE". Then, the program shifts to step S33.

At step S33, the numerical data stored in the digit $M_1$ is transmitted to the synthesizing unit 50. Then, an analog voice data corresponding to the numerical data is obtained by the synthesizing unit 50 and applied to the speaker 38, which outputs voice indicating the numerical data. Then, the program shifts to step S34.

At step S34, an analog voice data corresponding to "NEXT IS" is obtained by the synthesizing unit 50, applied to the speaker 38, which outputs a voice "NEXT IS". Then, the program shifts to step S35.

At step S35, an analog voice data corresponding to "DIGIT LIMITATION" is obtained by the synthesizing unit 50 and applied to the speaker 38, which outputs voice "DIGIT LIMITATION". Then, the program returns to step S8.

At step S31, when it is judged that the contents of the digit $M_8$ are not "1", the program shifts to step S36.

At step S36, it is judged whether or not the contents of the digit $M_8$ of the register M are "2". When it is judged that the data in the digit $M_8$ is "2", the program shifts to step S37.

At step S37, an analog voice data representing "DIGIT LIMITATION" is obtained by the synthesizing unit 50 and is transmitted to the speaker 38, which outputs voice "DIGIT LIMITATION". Then, the program shifts to step S38.

At step S38, the numerical data stored in the digit $M_1$ of the register M is transferred to the synthesizing unit 50, which obtains an analog voice data corresponding to the numerical data, transferring it to the speaker 38. Then, the speaker 38 outputs a voice indicating the numerical data. Then, the program shifts to step S39.

At step S39, an analog voice data corresponding to the "NEXT IS" is obtained by the synthesizing unit 50 and transmitted to the speaker 38, which outputs voice "NEXT IS". Then, the program shifts to step S40.

At step S40, an analog voice data corresponding to the "UNIT PRICE" is obtained by the synthesizing unit 50 and applied to the speaker 38, which outputs voice "UNIT PRICE". Then, the program returns to step S8.

At step S36, when it is judged that the contents of the digit $M_8$ are not "2", the program shifts to step S41.

At step S41, an analog voice data corresponding to the "UNIT PRICE" is obtained by the synthesizing unit 50 and applied to the speaker 38 which outputs voice "UNIT PRICE". Then, the program shifts to step S42.

At step S42, the amount data "¥ . . . " stored in the digits $M_1$ to $M_7$ of the register M is applied to the synthesizing unit 50, which obtains an analog voice data corresponding to the amount data "¥ . . . " and applies it to the speaker 38. The speaker 38 outputs voice "¥ . . . " on the basis of the analog voice data. Then, the program shifts to step S43.

At step S43, an analog voice data corresponding to "SETTING IS FINISHED" is obtained by the synthesizing unit 50 and transferred to the speaker 38, which outputs voice "SETTING IS FINISHED". Then, the program shifts to step S44.

At step S44, "0" is written into the memory area SF. Then, the program returns to the step S8.

At step S29, when it is judged that the blanking code "15" is stored in the digits $M_{10}$ and $M_{11}$, the program shifts to step S45.

At step S45, other processing is performed. Then, the program returns to step S8.

At step $S_1$ shown in FIG. 5, when it is judged that the input signal IN is not outputted, the program shifts to step S46.

At step S46, it is judged whether the contents of the memory area EF are "0", "1" or "2". When it is judged that the contents of the memory area EF are "2", the steps S13 and S15 shown in FIG. 6 are executed successively; when it is judged that the contents of the memory area EF are "1", the steps S14 and S15 are sequentially executed, and when it is judged that the contents of the memory area EF are "0", the program shifts to step S47.

At step S47, it is judged whether the contents of the memory area SF are "0", "1" or "2". When it is judged that the contents of the area SF are "1", the steps S34 and S35 shown in FIG. 7 are successively executed, when it is judged that the contents of the memory area SF are "2", the steps S39 and S40 are sequentially executed; and when it is judged that the contents of the memory area are "0", the program returns to step $S_1$.

FIGS. 8A to 8D illustrate key operations at the input section 12, displays in the display section 24 and vocal sounds outputted from the speaker 38.

Figure 8A:
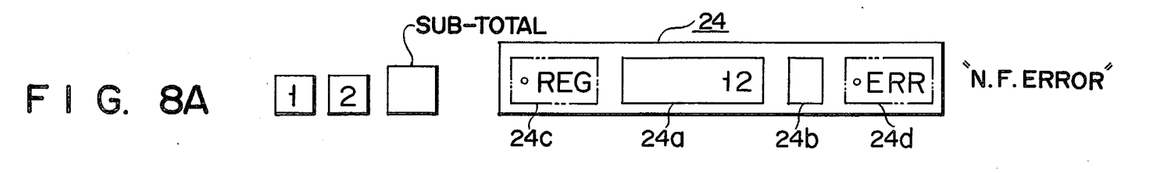
FIGS. 8A to 8D and FIGS. 9A to 9C show actual key operations of the embodiment shown in FIG. 1, displays by a display section corresponding to the key operations and the contents of the vocal sounds produced from the vocal output circuit corresponding to the displays of the display section.

It is assumed that the registration/set mode switch at the input section 12 is set to the "REG" mode. Under this condition, when numerical keys [1] and [2] are operated and then the sub-total key is operated as shown in FIG. 8A, "12" is displayed in the amount display section 24a of the display section 24 and the LED of the "REG" at the mode display section 24c is lit. Since the operation of the sub-total key after the entry of figures is error, the LED of "ERR" at the guidance display portion 24d is lit. Simultaneously with those display operations, the steps $S_1$ to $S_5$, $S_9$, $S_{10}$, $S_{12}$ and $S_{14}$ are successively executed. As a result, voice "N.F. ERROR" is outputted from the speaker 38. The voice is the operator guidance. Hearing voice "N.F. ERROR", the operator learns that the key to next be operated is the clear key. The execution sequence of the steps $S_8$, $S_1$, $S_{46}$, $S_{14}$, $S_{15}$ continues until the clear key is operated. Thus, voice "N.F. ERROR" is repeatedly outputted from the speaker 38.

Figure 8B:
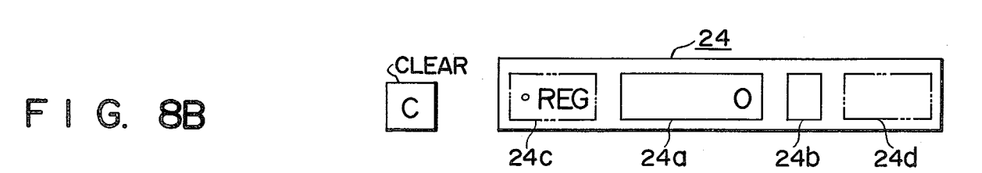

When the clear key is operated, as shown in FIG. 8B, the entry data "12" is cleared, "0" is displayed at the amount display portion 24a of the display section 24, and the LED of "ERR" at the guidance display portion 24d goes out. At this time, the LED of "REG" at the mode display portion 24c remains on. The clear key operation leads to that at step $S_1$, it is judged that the input signal IN is present, so that the program shifts to steps $S_2$, $S_3$. Thus, the outputting of "N.F. ERROR" stops.

Figure 8C:
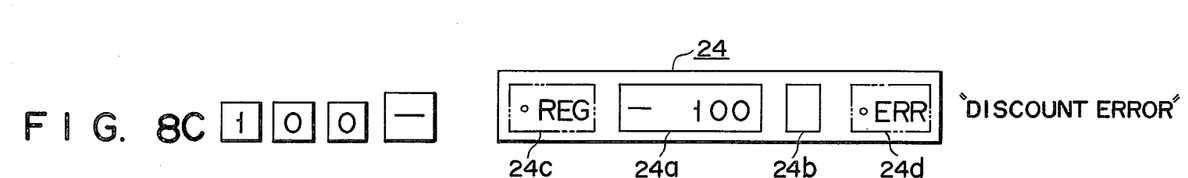

When the numerical keys [1], [0] and [0] are operated and then the discount key [-] is operated as shown in FIG. 8C, the numerical data "100" and a sign "-" representing a discount are displayed at the amount display section 24a and the LED of "REG" at the mode display 24c is lit. Simultaneously with these display operations, the steps $S_1$ to $S_5$, $S_9$ to $S_{11}$, $S_{13}$ and $S_{15}$ are successively executed, with the result that voice "DISCOUNT ERROR" is outputted as the operator guidance by the speaker 38. After hearing the voice, the operator learns that the clear key must next be operated. The steps $S_8$, $S_1$, $S_{46}$, $S_{13}$ and $S_{15}$ are successively executed until the clear key is operated. As a result, the voice "DISCOUNT ERROR" is repeatedly produced from the speaker 38.

Figure 8D:
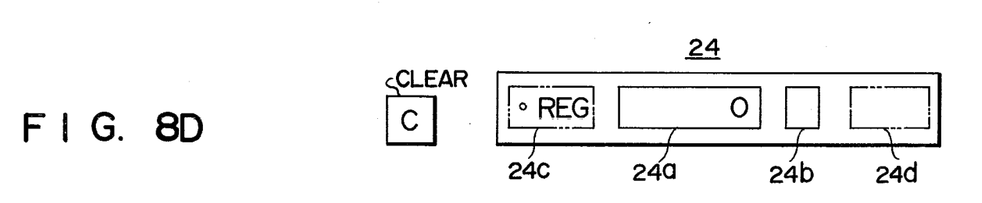

When the clear key is operated as shown in FIG. 8D, the numerical data "100" is cleared, "0" is displayed at the amount display portion 24a and the LED of "ERR" at the guidance display portion 24d goes out. At this time, the LED of "REG" at the mode display portion 24c remains on. As the result of the operation of the clear key, at step $S_1$, it is judges that the input signal is present, so that the outputting of the voice "DISCOUNT ERROR" stops.

Figure 9A:
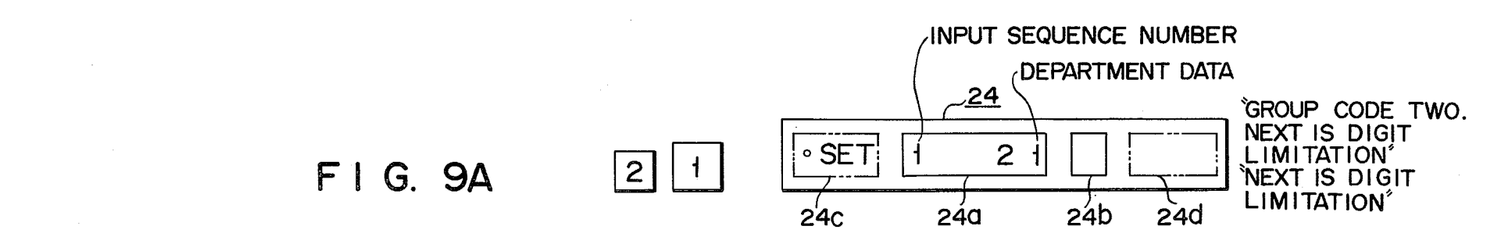

Then, it is assumed that the registration/set mode switch at the input section 12 has been switched to the "SET" mode. Explanation will be given of a case that, under this condition, various preset data about the department "1" are entered. When the numerical key ② is first operated to enter a group code and then the department key ① is operated as shown in FIG. 9A, the LED of "SET" at the mode display portion 24c of the display portion 24c is lit, and the preset data input sequence "1", the group code "2", and the department data "1", are displayed at the amount display portion 24a. Simultaneously with those display operations, the steps $S_1$, $S_{46}$, $S_{47}$, $S_{29}$ to $S_{35}$ are successively executed, so that voice "GROUP CODE TWO. NEXT IS DIGIT LIMITATION" is outputted from the speaker 38 as the operator guidance. Hearing the voice, the operator learns that the group code "2" has been entered and the next operation is the digit limitation. Then, the steps $S_1$, $S_{46}$, $S_{47}$, $S_{34}$ and $S_{35}$ are repeatedly executed in sequence until the digit limitation is operated. Therefore, voice "NEXT IS DIGIT LIMITATION" is repeatedly outputted from the speaker 38.

Figure 9B:
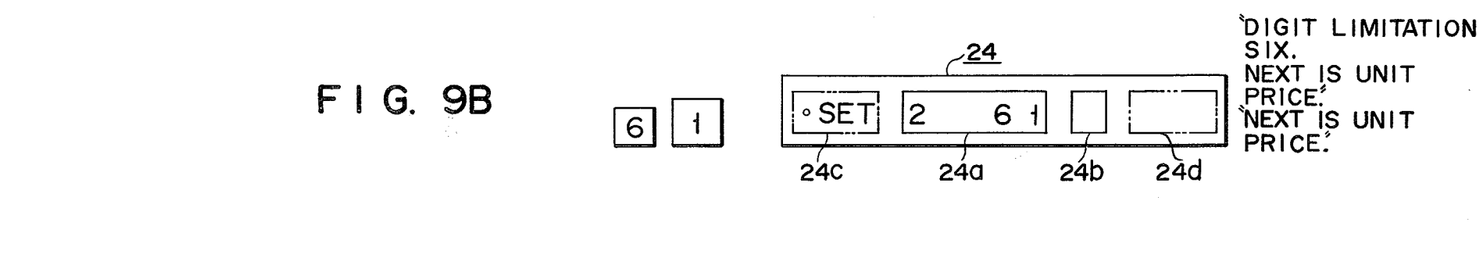

When the department key ① is pushed after the numerical key ⑥ has been depressed, thus entering the maximum number of digits, numeral "2" showing the input sequence of the preset data, numeral "6" showing the maximum number of digits and numeral "1" showing the department are displayed in the amount display portion 24a as illustrated in FIG. 9B. The LED of "SET" of the mode display portion 24c is still lit. While numerals "2", "6" and "1" are displayed and the LED of "SET" is lit, steps $S_1$, $S_{46}$, $S_{47}$, $S_{29}$ to $S_{31}$ and $S_{36}$ to $S_{40}$ are executed in sequence. As a result, the speaker 38 announces: "DIGIT LIMITATION SIX. NEXT IS UNIT PRICE." The operator therefore learns that the maximum number of digits, i.e. "6" has been inputted and that the next step will concern price. Until the operator operates keys to start the next step, steps $S_1$, $S_{46}$, $S_{47}$, $S_{39}$ and $S_{40}$ are repeated in sequence and the speaker 38 repeats the announcement "NEXT IS UNIT PRICE".

Figure 9C:
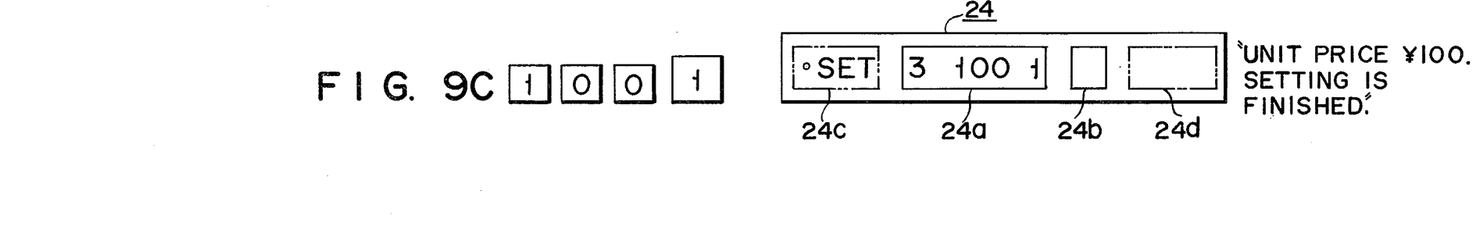

When the department key ① is pushed after the numerical key ① has been pushed once and the numerical key ⓪ has been pushed twice, thus entering the price, i.e. "100 yen", numeral "3" showing the input sequence of the preset data, numerals "100" showing the unit price and numeral "1" showing the department are displayed in the amount display portion 24a as illustrated in FIG. 9C. The LED of "SET" of the mode display portion 24c is still lit. While numerals "3", "100" and "1" are displayed and the LED of "SET" is lit, steps $S_1$, $S_{46}$, $S_{47}$, $S_{29}$ to $S_{31}$, $S_{36}$ and $S_{41}$ to $S_{44}$ are executed in sequence. Consequently, the speaker 38 announces: "UNIT PRICE ONE HUNDRED YEN. SETTING IS FINISHED." The operator therefore learns that the unit price has been inputted and that the keys have been operated to enter the preset data.

Figure 10:
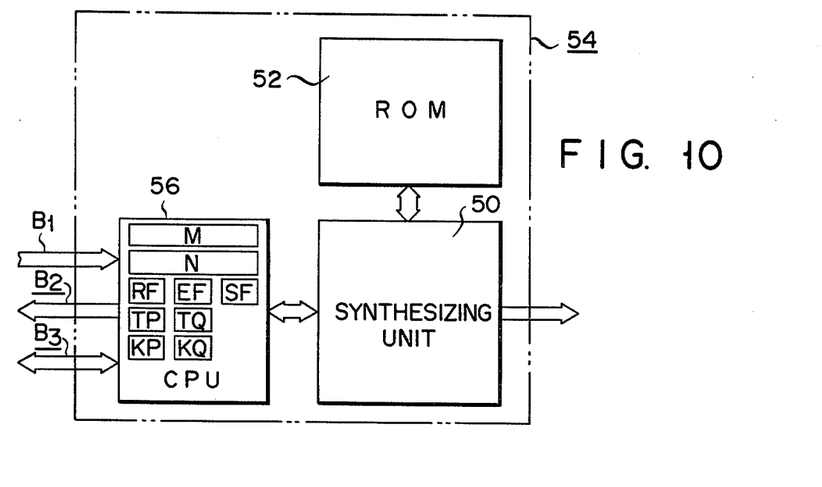
FIG. 10 shows a block schematic diagram of an arrangement of the voice conversion section of a second embodiment according to the present invention.

FIG. 10 is a block diagram schematically showing a voice conversion section 54 of another voice output circuit according to this invention. The voice conversion section 54 is identical with the voice conversion section 36 shown in FIG. 3, except that not only registers M and N but also other registers TP, TQ, KP and KQ are provided in a CPU 48.

Stored in the register TP are time count data. Stored in the register TQ is a data determining time interval of announcement. The register KP stores data representing how many times announcement is made. Stored in the register KQ is a data showing how many times announcement should be repeated.

Figure 11:
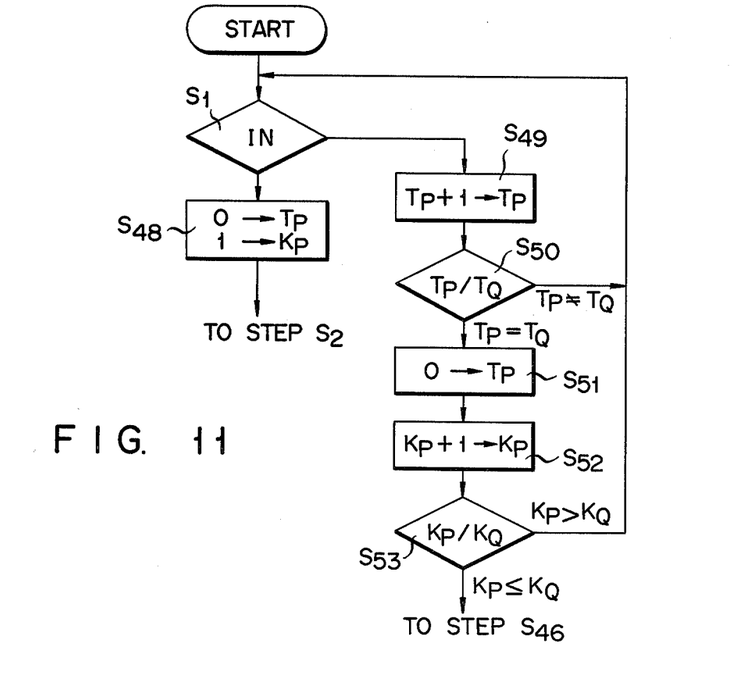
FIG. 11 shows a part of a flow chart of voice conversion steps executed by the voice conversion section shown in FIG. 10.

FIG. 11 shows a part of a flow chart illuminating how the voice conversion section 54 of FIG. 10 operates.

At step $S_1$, it is judged whether or not the voice control section 34 outputs an input signal IN. When it is judged that the signal IN is outputted, the program shifts to step $S_{48}$ and when it is judged that the input signal IN is not outputted, the program shifts to step $S_{49}$.

At step $S_{48}$, "0" is written into the register TP and "1" into the register KP. Then, the program shifts to step $S_2$ shown in FIG. 5.

At step $S_{49}$, "1" is added to the contents of the register TP and then the result of the addition is restored into the register TP. Then, the program shifts to step $S_{50}$.

At step $S_{50}$, the register TQ previously stored with a specified value has its contents compared with the contents of the register TP. When the contents of those registers are not equal, the program returns to the step $S_1$. On the other hand, when those are equal, the program shifts to step $S_{51}$. As described above, when the operator guidance is audibly produced, the time interval from the present to the next sounding is previously set in the register TQ and after the time interval, the program shifts to step $S_{51}$.

At step $S_{51}$, "0" is written into the register TP, that is the contents of the register TP is cleared. Then, the program shifts to step $S_{52}$.

At step $S_{52}$, "1" is added to the contents of the register KP and the result of the addition is restored into the register KP. Then, the program shifts to the next step $S_{53}$. Since the initial value of the register KP has been set to "1" at step $S_{48}$, the execution of step $S_{52}$ lead to the value of the register KP becoming at least more than "2".

At step $S_{53}$, the register KQ previously stored with the number of voice outputs has its contents compared with the contents of the register KP. When the contents of the register KP is larger than those of the register KQ, the program returns to the step $S_1$, whereas when the contents of the register KP are equal to or smaller than those of the register KQ, the program shifts to the step $S_{46}$ shown in FIG. 5. Then, in accordance with the aforesaid steps the operator guidance is outputted.

As described above, by operating the voice conversion section 54 in accordance with the flow chart shown in FIG. 11, the number of repeated voices of the operator guidance and the time interval between the adjacent repeated voices can be preset appropriately.

The present invention is not limited to the first and second embodiments. Although in the first and second embodiments, the voice output circuit 32 is connected in a removable manner to the address bus line AB, the data bus line DB, the chip designating signal lines $CSL_1$ to $CSL_4$ and the read/write signal line R/WL, the circuit 32 may be fixedly connected to those lines.

Although the first and second embodiments are the ones in which the present invention is applied to the electronic cash register, the present invention is applicable for electronic computers with a voice outputting function.

In the first and second embodiments, the operator nd N, and the memory areas RF, EF and SF and the CPU 56 of the voice conversion section 54 in the second embodiment has the registers M and N, the memory areas RF, EF and SF, and the registers TP, TQ, KP and KQ, the CPUs may have more or less registers and memory areas according to the number of the operator guidances to increase or decrease the kinds of the operator guidances.

The present invention may be variously changed and modified without departing from the spirt of the present invention.

What is claimed is:

1. A voice data output apparatus comprising:
   input means having numerical keys for inputting numerical data and function keys for indicating types of operations, said input means inputting data in accordance with a predetermined key operation sequence;
   control means coupled to said input means for performing a specified operation in accordance with an input signal from said input means to produce next operator guidance data corresponding to that key among said numerical and function keys which is to be operated next; and
   voice output means coupled to said control means for automatically and repetitively producing in vocal sound said next operator guidance data delivered from said control means, until said key corresponding to said next operator guidance data is operated.

2. A voice data output apparatus according to claim 1, wherein said voice output means comprises:
   voice control means coupled to said control means for temporarily storing said next operator guidance data delivered from said control means;
   voice conversion means coupled to said voice control means for producing at least an analog voice signal; according to said next operator guidance data temporarily stored in said voice control means, said analog voice signal being repetitively produced until said key corresponding to said next operator guidance data is operated; and
   a speaker coupled to said voice conversion means for outputting a voice sound according to the analog voice signal delivered from said voice conversion means.

3. A voice data output apparatus comprising:
   input means having numerical keys for inputting numerical data and function keys for indicating the type of operations, said input means for inputting data in accordance with a predetermined key operation sequence;
   control means coupled to said input means for performing a specified operation, in accordance with an input signal from said input means, to produce next operator guidance data corresponding to that key among said numerical and function keys which is to be operated next; and
   voice output means coupled to said control means for automatically and repetitively producing in vocal sound said next operator guidance data delivered from said control means, until the outputting of said vocal sound is repetitively carried out a specified number of times.

4. A voice data output apparatus according to claim 3, wherein said voice output means comprises:
   voice control means coupled to said control means for temporarily storing said next operator guidance data delivered from said control means;
   voice conversion means coupled to said voice control means for producing at least an analog voice signal according to said next operator guidance data temporarily stored in said voice control means, said analog voice signal being repetitively produced a predetermined number of times; and
   a speaker coupled to said voice conversion means for outputting a voice according to the analog voice signal delivered from said voice conversion means.

* * * * *